United States Patent [19]

Lin

[11] Patent Number: 5,095,723

[45] Date of Patent: Mar. 17, 1992

[54] ANTI-THEFT STEERING WHEEL LOCK FOR AUTOMOBILES

[76] Inventor: Miun-Chang Lin, 81, Sheng Li Street, Kuei Jen Hsiang, Tainan, Hsien, Taiwan

[21] Appl. No.: 690,488

[22] Filed: Apr. 24, 1991

[51] Int. Cl.⁵ .............................................. B60R 25/02
[52] U.S. Cl. ........................................ 70/209; 70/226; 70/238
[58] Field of Search .............. 70/225, 226, 237, 238, 70/209, 211, 212, 239, 227, 258

[56] References Cited

U.S. PATENT DOCUMENTS

| | | | |
|---|---|---|---|
| 1,429,334 | 9/1922 | Furber | 70/211 X |
| 1,448,658 | 3/1923 | Furber | 70/211 X |
| 3,138,036 | 6/1964 | Carson | 70/211 X |
| 3,462,982 | 8/1969 | Moore . | |
| 4,103,524 | 8/1978 | Mitchell et al. . | |
| 4,304,110 | 12/1981 | Fain . | |
| 4,444,030 | 4/1984 | Dausch | 70/209 |
| 4,738,127 | 4/1988 | Johnson . | |
| 4,829,797 | 5/1989 | Wu | 70/226 X |
| 4,882,920 | 11/1989 | Wu | 70/226 X |
| 4,974,433 | 12/1990 | Wang | 70/237 X |
| 5,005,388 | 4/1991 | Lo | 70/226 X |

FOREIGN PATENT DOCUMENTS

| | | | |
|---|---|---|---|
| 631708 | 1/1935 | Fed. Rep. of Germany | 70/211 |
| 2314333 | 10/1973 | Fed. Rep. of Germany | 70/211 |
| 802490 | 9/1936 | France | 70/212 |

Primary Examiner—Renee S. Luebke
Assistant Examiner—Suzanne L. Dino
Attorney, Agent, or Firm—Lowe, Price, LeBlanc & Becker

[57] ABSTRACT

An anti-theft steering wheel lock comprises an elongated body member having a passage along an axis therethrough, an upper shield having an arcuate portion for covering the outer edge of a steering wheel and a flat board at one end, a lower shield also having an arcuate portion for covering the inner edge of the steering wheel and coacting with the upper shield. The elongate body also has a housing formed into a rectangular shape and having a long slot along one side for fixedly securing to the flat board, an a bore along the axis for securing a lock body, a square passage at one side of the housing diametrically opposed to the long slot for fixedly securing the elongated lock body and also for accepting a lock rod to control the movement of the housing, and two small square holes at its bottom for installing two latches. Each of the latches has a slidable detent that meshes with sprockets of the lock rod to control the movement of the housing relative to the lock rod. The device acts to lock the steering wheel by embracing its rim with the upper and the lower shields and extending an elongated body member from the opposed end of the housing so that it will limit the turning of the steering wheel.

5 Claims, 6 Drawing Sheets

ANTI-THEFT STEERING WHEEL LOCK FOR AUTOMOBILES

PRIOR OF ART

Figure 11:
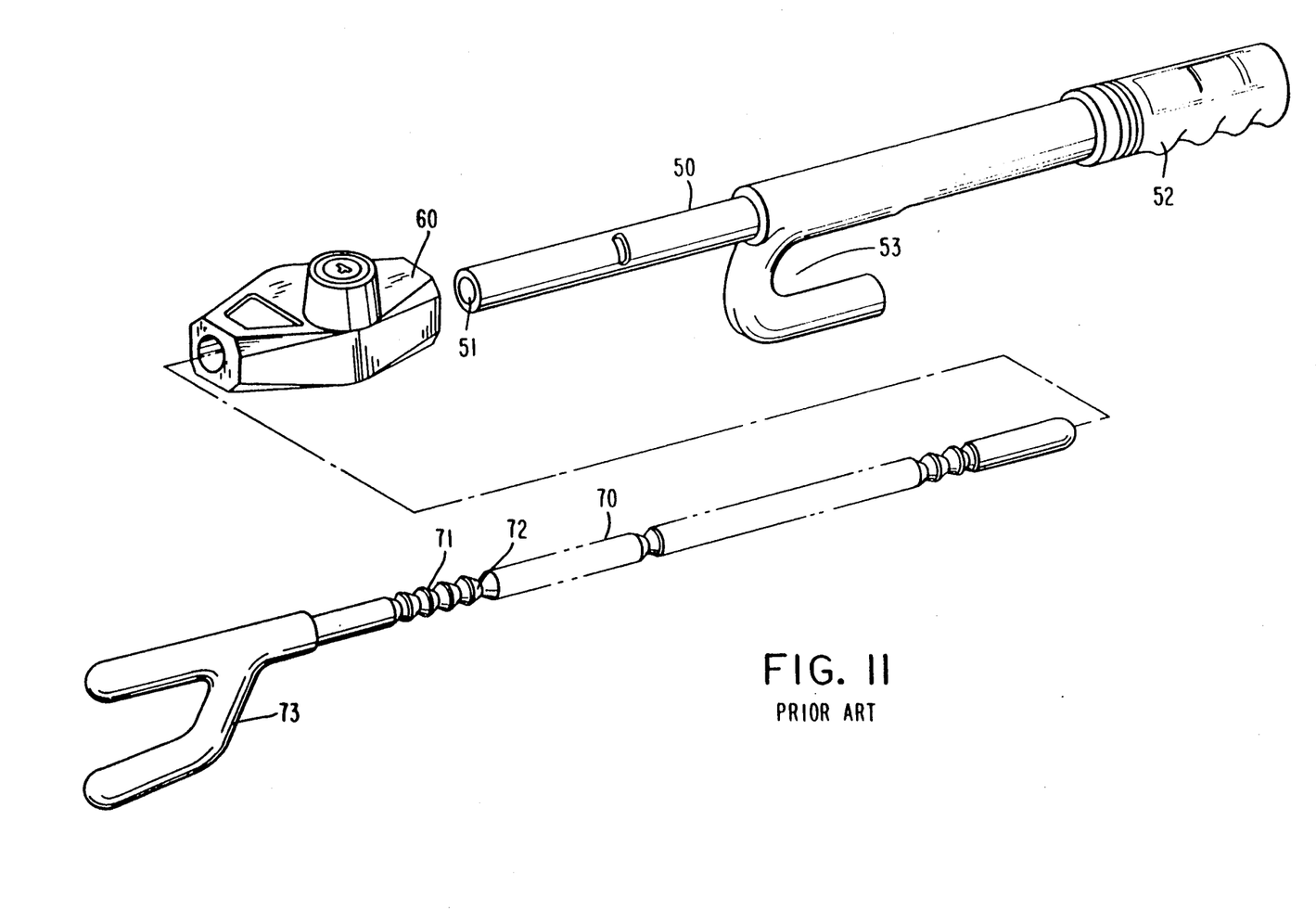
FIG. 11 illustrates a known device.

Antitheft steering wheel lock devices are known, as shown in U.S. Pats. No. 4,304,110 to Fain; 4,103,524 to Mitchell et al; 3,462,982 to Moore; and 4,738,127 to Winner. The first three are analyzed improved in U.S. Pat. No. 4,738,127, to Winner. However, Winner patent "Automobile Steering Lock" which shown as in FIG. 11, which has an elongated body member 50 having a passage 51 extending along an axis therethrough, a portion extending opposite to the passage installed with a handle 52 and a first hook means 53 secured to the body member 50 for engaging a steering wheel from the inside thereof, a locking member 60, an elongated rod 70 adapted to move freely in a telescopic fashion in the passage 51 of the body member 50 along the axis with a second hook means 73 secured to the rod for engaging the inside portion of the steering wheel diametrically opposed to the first hook means 52 and by means of the extended portion of the elongated body member 50 to secure the vehicle.

BACKGROUND OF THE INVENTION

This invention relates to an antitheft steering wheel lock which uses two shields to embrace the rim of a steering wheel and an elongated body member extending beyond the steering wheel by engaging the wind shield or operator to prevent unauthorized operation of the vehicle.

When the two hooks of the winner device engage to the rim from inside of the steering wheel, the space between grooves sometimes makes the locked position either too loose or too tight. If it is too tight, for instance, the lock would be difficult to open. This problem is overcome by the present invention by the use of two latches to engage with a sprocket. The two latches comprise of two stoppers which stop twice at each space in comparison with the prior art which has only one stopper and can stop only once at each space. This means that if prior art has one inch per each space, the present invention should be half inch at each space which overcomes the above-mentioned problem.

SUMMARY OF THE INVENTION

It is the primary object of the present invention to provide an antitheft steering wheel for automobiles which has two shields to embrace the steering wheel to prevent the steering wheel from moving.

It is another object of the present invention to provide an antitheft steering wheel lock for automobiles which has two latches to mesh with grooves that provide a better locking situation.

It is still another object of the present invention to provide an antitheft steering wheel lock for automobiles which needs no key to lock a steering wheel.

It is a further object of the present invention to provide an antitheft steering wheel lock for automobiles which is easy to operate.

DETAILED DESCRIPTION OF THE PREFERRED EMBODIMENT

Figure 1:
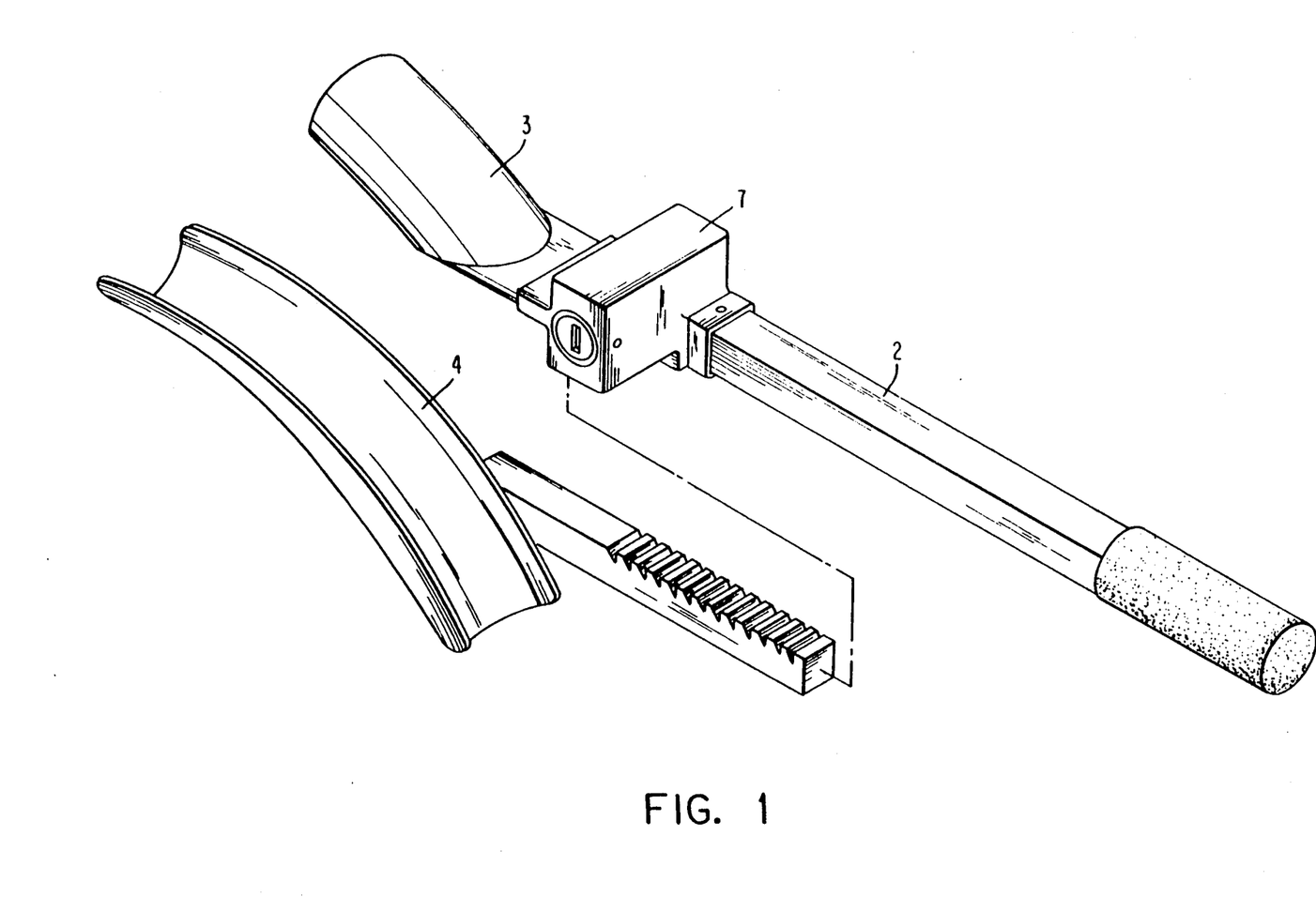
FIG. 1 is a perspective view of the present invention.
Figure 2:
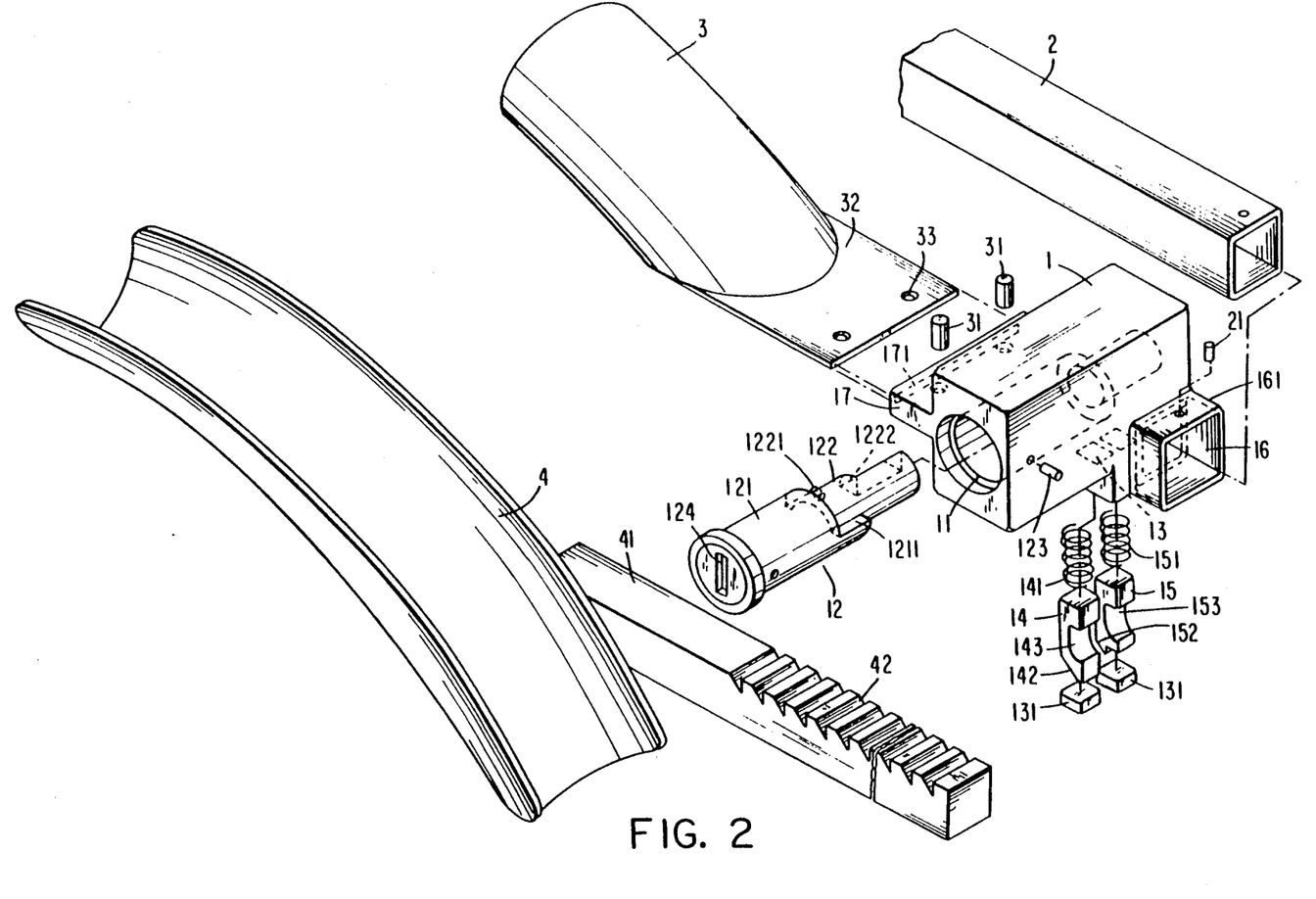
FIG. 2 is a fragmentary view of the present invention.

The drawings, and in particular to FIGS. 1 and 2, show an antitheft steering wheel lock for automobiles according to the present invention which is composed of a lock body 1 in a rectangular shape, an elongated body member 2, an upper shield 3, and a lower shield 4. More specifically, the lock body 1 is comprised of a bore 11 provided for securing a locking means 12 with a pin 123, a square boss 161 having a passage 16 to fixedly secure the body member 2 with a pin 21. Lock rod 41 has sprockets 42 provided along a major section on its top and is welded to one end of the lower shield 4. Square boss 161 has a slim boss 17 at one side opposed to the square passage 16 and having a slot 171 adapted to fixedly secure a flat board 32 integrally formed with one end of said upper shield 3 with two pins 31. Two small square holes 13 are formed at the bottom of square boss 161 for maintaining two latches, a first latch 14 and a second latch and two springs 141, 151, to communicate with the square passage 16.

The locking means 12 is generally composed of a key lock 121 and a locking member 122. The key lock 121 is conventional and has a semi-circular shoulder 1211 at its end. The locking member 122 is preferably cylindrical in shape and includes a flange 1221 provided at its top portion where, when rotating the locking member 122, the flange 1221 will be stopped at either end of the semi-circular shoulder 1211 to limit its moving range, and a recessed portion 1222.

Each of the two latches 14 and 15 is shaped like a square post and have recessed portions 143 and 153, respectively, at a front side to be controlled by the locking member 122, and two stoppers 142 and 152 at the respective bottom ends. The stopper 142 of the first latch 14 is formed by cutting a portion slanting down from the back toward the front bottom end while the stopper 152 of the second latch 15 also has a portion being cut to slant from back half way to the front end at its bottom. The two recessed portions 143 and 153 engage with the locking member 122 at all times while the two stoppers 142 and 152 mesh with the sprockets 42 of the lock rod 41.

Figure 3:
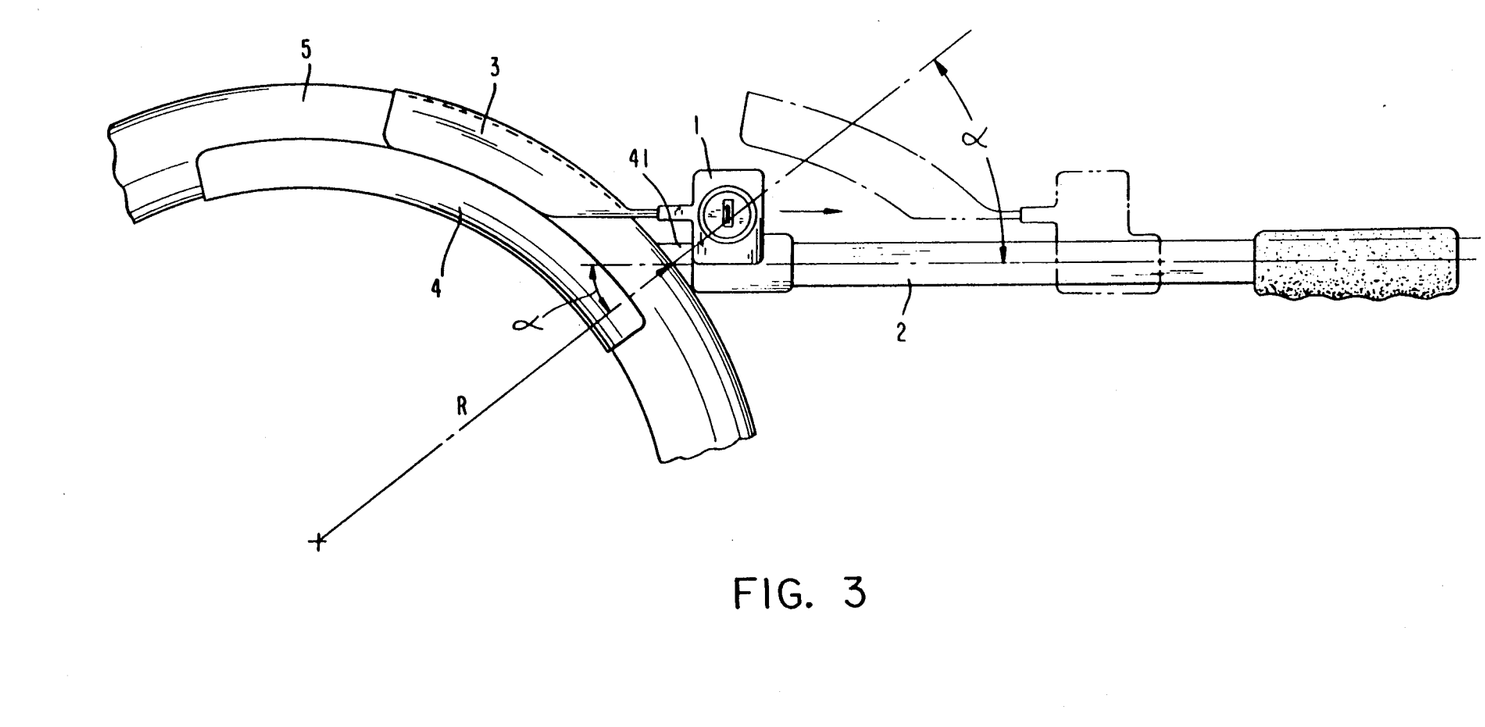
FIG. 3 is a plan view of the present invention which is fixed at a steering wheel.

FIG. 3 shows a steering wheel 5 is locked by the present invention which demonstrates how the lower shield 4 embraces the wheel 5 from the inside of thereof and the upper shield 3, which is fixedly secured to the lock body 1, can be moved forwardly to embrace the wheel 5 from the outside thereof. The lock body 1 which as shown and described in FIG. 2 has the two latches 14 and 15 seated on the sprockets 42 of the lock rod 41. By pushing the lock body 1 oriented toward the wheel 5 with the recessed portion 1222 of the locking member 122 facing the two recessed portions 143 and 153 of the two latches 14 and 15, the two stoppers 142 and 152 overcome the ratcheting effect of the sprockets 42 of the lock rod 41 and move forward until the upper shield 3 has reached to and tightly embraced the rim of the steering wheel 5. The elongated body member 2 then prevents complete rotation of the steering wheel by engaging the driver or the windshield of the vehicle.

As best seen in FIG. 3, the axis of elongated body 2 intersects the rim of steering wheel 5 in such a way that it forms an acute angle "α" with a radius "R" of the steering wheel thereat.

Figure 4:
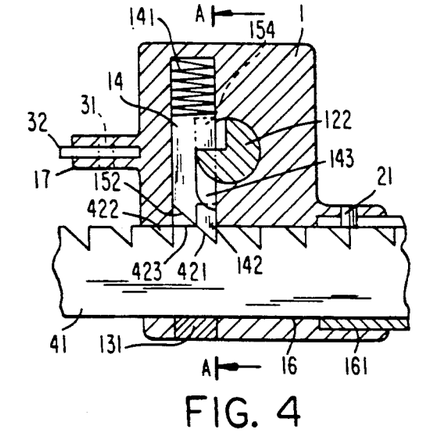
FIG. 4 is a side cross sectional view of the lock body of FIG. 1, showing a first latch means meshed with the sprockets and the second latch means separated from the sprockets.
Figure 5:
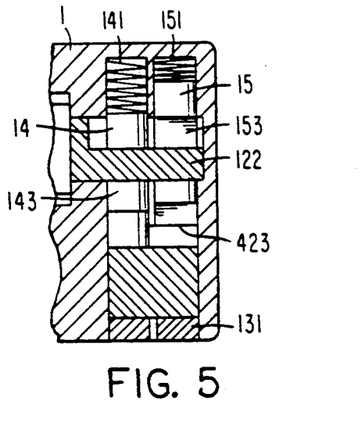
FIG. 5 is a front cross sectional view taken on line A—A of FIG. 4.

In operation, when the recessed portion 1222 of the locking member 122 is oriented toward the recessed portions 143 and 153, the stopper 143 meshes with a spline 421 (shown as in FIG. 4) and the stopper 152, which is seated on top of the intermediate surface 423 (shown as in FIG. 5). The condition may also be found from the compression or not of the two springs 141 and 151.

Figure 6:
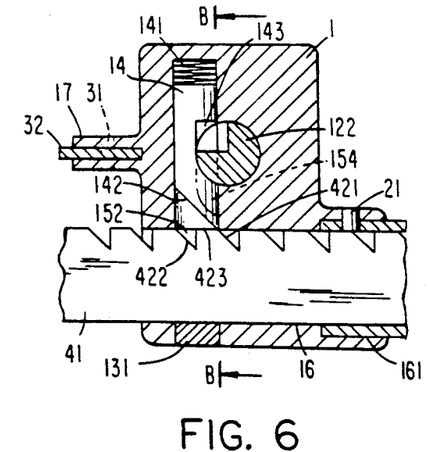
FIG. 6 is a same side cross sectional view of FIG. 4, showing the first latch means separated from the sprockets while the second latch means meshed with the sprockets.
Figure 7:
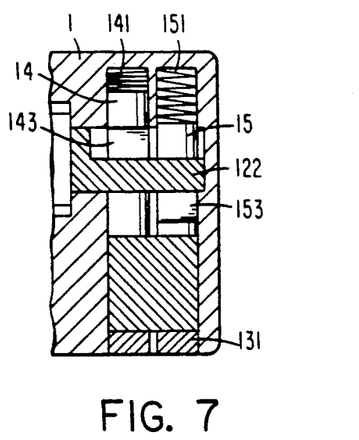
FIG. 7 is a front cross sectional view taken on line B—B of FIG. 6.
Figure 8:
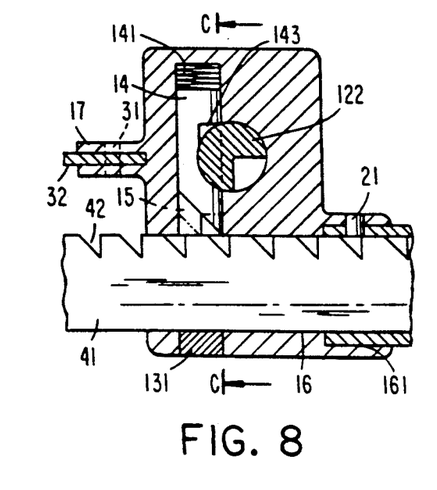
FIG. 8 is still the same cross sectional view of FIG. 4, showing both the first and the second latch means are seperated from the sprockets.
Figure 9:
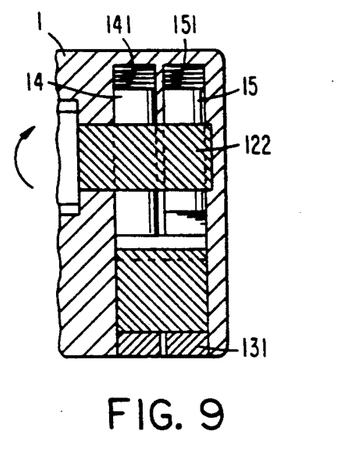
FIG. 9 is a front cross sectional view on line C—C of FIG. 8.

FIG. 6 is another perspective sectional view of the present invention, which represents that the locking member 2 has moved a small step toward left hand side and which shows that the recessed portion 1222 of the locking member 122 faces the two recessed portions 143 and 153, the stopper 142 of the latch 14 is seated on the intermediate surface 423, and the stopper 152 meshes with the spline 422 of the sprockets. FIG. 7 is taken on line B—B of FIG. 6 which gives a better view of the locking condition by observing the compression of the two springs 141 and 151. FIGS. 8 and 9 show how the recessed portion 1222 of the locking member 122 is turned and leaves the arcuate outer surface of the locking member 122 facing the recessed portions 143 and 153 that bring both latches 14 and 15 upwardly and seat on the intermediate surface 423, which represents the unlocked condition in which locking member 2 can move telescopically on the lock rob 41. The two stoppers 142 and 152 eliminates the problem of too much tightness or looseness of the prior art which uses only one stopper or spherical bearings to engage with grooves to restrict the locking rod and which lacks flexibility of adjustment. The present invention uses two stoppers to do a double-adjustment and therefore, provides a double-density that eliminates the above problem when locked.

Figure 10A:
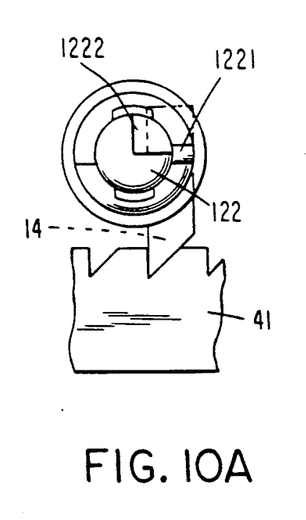
FIGS. 10A and 10B are two end views of the lock body in relation to operate and inoperate position.
Figure 10B:
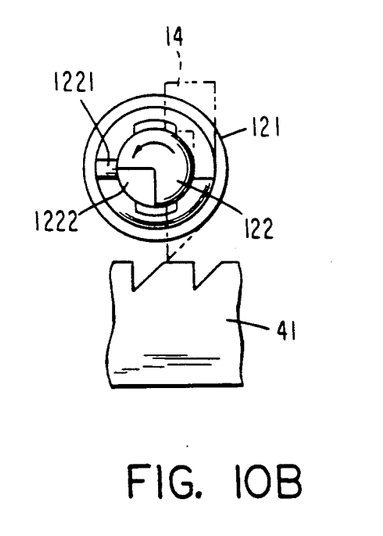

FIGS. 10A and 10B are taken from behind of the locking member 2. FIG. 10A shows the recessed portion 122 facing the two recessed portions 143 and 153 that allow the two latches 14 and 15 to descend and make either one or both of the two stoppers 142 and 152 mesh with the sprockets 42 to a locked condition. FIG. 10B shows recessed portion 1222 of the locking member 122 rotated 180 degrees to a second position, which brings the arcuate outer surface facing the two recessed portions 143 and 153 and lifts up both latches 14 and 15. This represents an unlocked condition of the present invention.

In general, a steering wheel is divided into several partitions by spokes, and the hook of prior of art can normally be hooked only to a small portion of one partition, i.e., the size of the hook is too narrow and the lock may be movable within the limited space. The lower shield 4 of the present invention, by contrast, has a longer length which should be able to embrace the partition of the steering wheel from the inner side and provide a better contact then prior of art.

In this disclosure, there shown and described only the preferred embodiments of the invention, but, as aforementioned, it is to be understood that the invention is capable of use in various other combination and environments and is capable of changes or modifications within the scope of the inventive concept as expressed herein.

I claim:

1. An anti-theft steering wheel lock for automobiles, comprising:

a rectangular shaped lock body having a bore along a first axis for receiving and fixedly securing a locking means, a square boss with a passage therethrough disposed along a second axis normal to said first axis, a slim boss formed along said second axis opposed to said square boss with a slot therein, and two small holes along a third axis normal to said first and second axes to accommodate two latches and communicating with both said bore and said square boss;

an elongate body member having a passage extended along an axis therethrough, with one end connected to a square passage;

an upper shield in an arcuate shape having an inner diameter of approximately the same size as the rim of a steering wheel and having a flat board extended at one end to be fixedly secured to said slot of said slim boss;

a lower shield in an arcuate shape having an inner diameter of approximately the same size as the rim of said steering wheel and having a lock rod welded thereto, said lock rod having sprockets axially spaced thereon, wherein said upper and lower shields coact to embrace a portion of the steering wheel rim, and a portion of said elongate body member extends outwardly from said steering wheel rim at an acute angle with respect to a radius of the steering wheel where said axis of the elongate member intersects the steering wheel rim and thereby prevents substantial rotation of the steering wheel.

2. An anti-theft steering wheel lock for automobiles according to claim 1, wherein:

said passage of said lock body has a boss to fixedly secure with said elongated body member.

3. An anti-theft steering wheel lock for automobiles comprising:

a rectangular shaped lock body having a bore along a first axis for receiving and fixedly securing a locking means, a square boss with a passage therethrough disposed along a second axis normal to said first axis, a slim boss formed along said second axis opposed to said square boss with a slot therein, and two small holes along a third axis normal to said first and second axes to accommodate two latches and communicating with both said bore and said square boss;

an elongate body member having a passage extending along an axis therethrough, with one end connected to a square passage;

an upper shield in an arcuate shape having an inner diameter of approximately the same size as the rim of a steering wheel and having a flat board extended at one end to be fixedly secured to said slot of said slim boss;

a lower shield in an arcuate shape having an inner diameter of approximately the same size as the rim of said steering wheel and having a lock rod welded thereto, said lock rod having sprockets axially spaced thereon, wherein said upper and lower shields coact to embrace a portion of the steering wheel rim, and a portion of said elongate body member prevents the substantial rotation of the steering wheel, and wherein said first latch comprises a square post having a recess at its middle portion and a slanting surface from a back surface to a front bottom end.

4. An anti-theft steering wheel lock for automobiles comprising:

a rectangular shaped lock body having a bore along a first axis for receiving and fixedly securing a locking means, a square boss with a passage therethrough disposed along a second axis normal to said first axis, a slim boss formed along said second axis opposed to said square boss with a slot therein, and two small holes along a third axis normal to said first and second axes to accommodate two latches and communicating with both said bore and said square boss;

an elongate body member having a passage extended along an axis therethrough, with one end connected to a square passage;

an upper shield in an arcuate shape having an inner diameter of approximately the same size as the rim of a steering wheel and having a flat board extended at one end to be fixedly secured to said slot of said slim boss;

a lower shield in an arcuate shape having an inner diameter of approximately the same size as the rim of said steering wheel and having a lock rod welded thereto, said lock rod having sprockets axially spaced thereon, wherein said upper and lower shields coact to embrace a portion of the steering wheel rim, and a portion of said elongate body member prevents the substantial rotation of the steering wheel, and wherein said second latch is also a square post having a recess at its middle portion and a slanting surface from a back surface half way to a front bottom end.

5. An anti-theft steering wheel lock for automobiles according to claim 1, wherein:

said respective passages of said locking member and said lock body are connected in such a way that said lock rod may move therein in telescopic fashion.

* * * * *

UNITED STATES PATENT AND TRADEMARK OFFICE
CERTIFICATE OF CORRECTION

PATENT NO. : 5,095,723
DATED : March 17, 1992
INVENTOR(S) : Ming-Chang LIN

It is certified that error appears in the above-identified patent and that said Letters Patent is hereby corrected as shown below:

On the title page, please correct the inventor's name as follows:
Change "Miun-Chang Lin" to --Ming-Chang Lin--

Signed and Sealed this

Tenth Day of August, 1993

Attest:

MICHAEL K. KIRK

Attesting Officer Acting Commissioner of Patents and Trademarks